(12) United States Patent
Kimberly et al.

(10) Patent No.: US 6,167,820 B1
(45) Date of Patent: Jan. 2, 2001

(54) ANHYDROUS AMMONIA APPLICATION DEVICE

(76) Inventors: Kevin H. Kimberly, 7753 NE. 134th Ave., Maxwell, IA (US) 50161; Darrell K. Geisler, 5251 NE. 94th Ave., Bondurant, IA (US) 50035

( * ) Notice: Under 35 U.S.C. 154(b), the term of this patent shall be extended for 0 days.

(21) Appl. No.: 09/430,339

(22) Filed: Oct. 29, 1999

(51) Int. Cl.[7] ................................................. A01C 23/00
(52) U.S. Cl. ................................................................. 111/119
(58) Field of Search .......................... 111/119, 118, 120, 111/127, 186, 188, 174, 129

(56) References Cited

U.S. PATENT DOCUMENTS

| | | | |
|---|---|---|---|
| 2,843,066 | * 7/1958 | Dugan | 111/119 |
| 2,857,863 | * 10/1958 | Jessen | 111/119 |
| 3,748,368 | * 7/1973 | Lin et al. | |
| 4,196,677 | * 4/1980 | Siebert | 111/119 |
| 4,284,243 | * 8/1981 | Shaner | 111/119 X |
| 4,825,959 | * 5/1989 | Wilhelm | 111/119 X |
| 4,970,936 | * 11/1990 | Denker et al. | 89/1.14 |
| 5,271,342 | * 12/1993 | Neidhardt | 111/119 |
| 5,383,495 | * 1/1995 | Kennedy | 138/89 |
| 5,452,673 | * 9/1995 | Bruce | 111/119 |

FOREIGN PATENT DOCUMENTS

| | | | |
|---|---|---|---|
| 3415723 | * 11/1985 | (DE) | 111/119 |
| 1463474 | * 11 1966 | (FR) | 111/119 |

* cited by examiner

*Primary Examiner*—Christopher J. Novosad
(74) *Attorney, Agent, or Firm*—G. Brian Pingel

(57) ABSTRACT

An application device used to deliver anhydrous ammonia gas from the manifold on an applicator to the soil and including an ammonia injector. The ammonia injector consists of a smooth, metallic tube capped on one end by a metallic cap which is a precisely hollowed out metal shaft. The ammonia is applied through bores precision-drilled in the cap. The components of the ammonia injector greatly increase the accuracy with which the anhydrous ammonia can be applied, reduce the pressure at which the ammonia must flow through the injectors resulting in better and more even distribution in the soil, and increase the useful life of the injector.

7 Claims, 2 Drawing Sheets

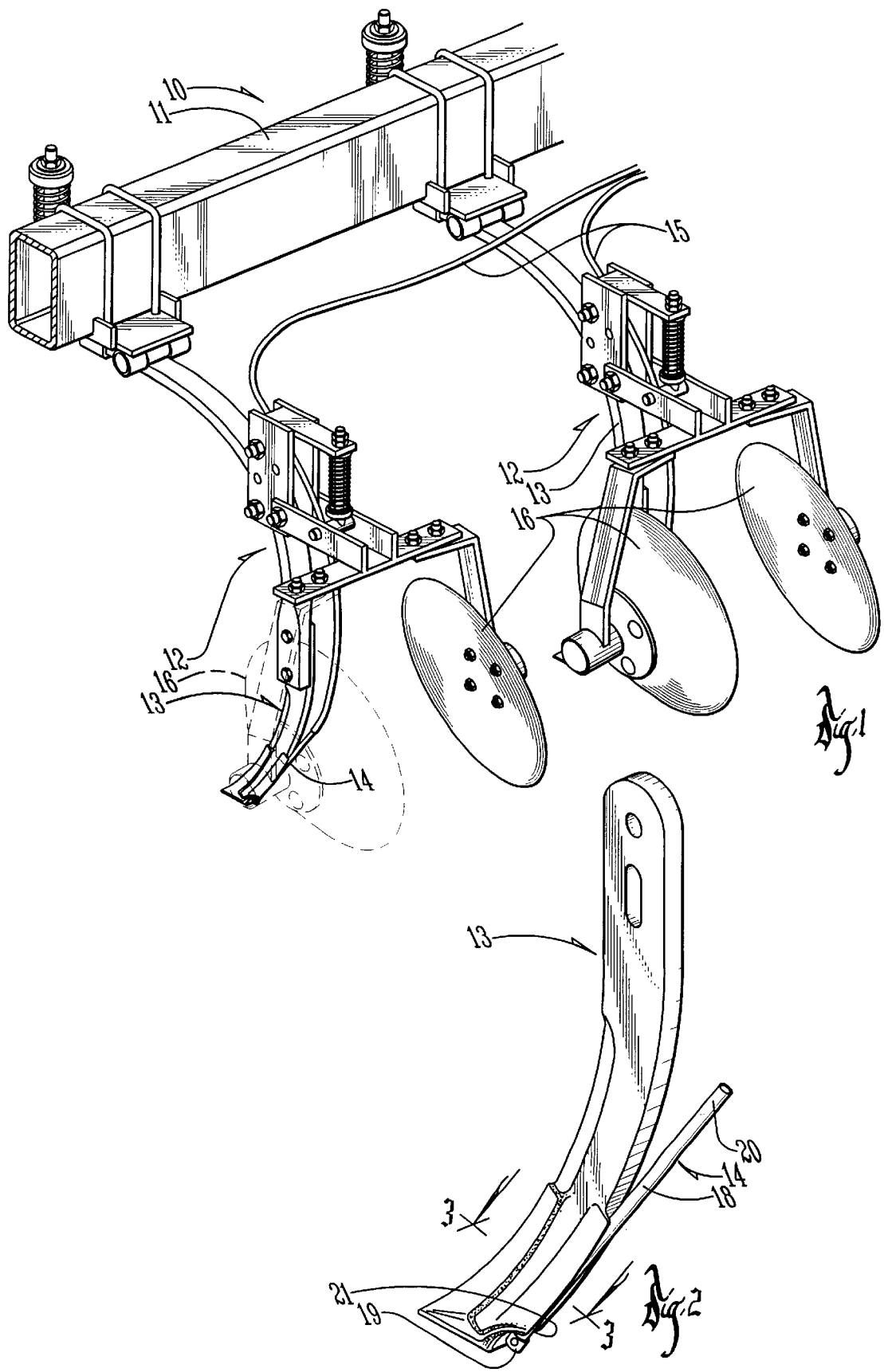

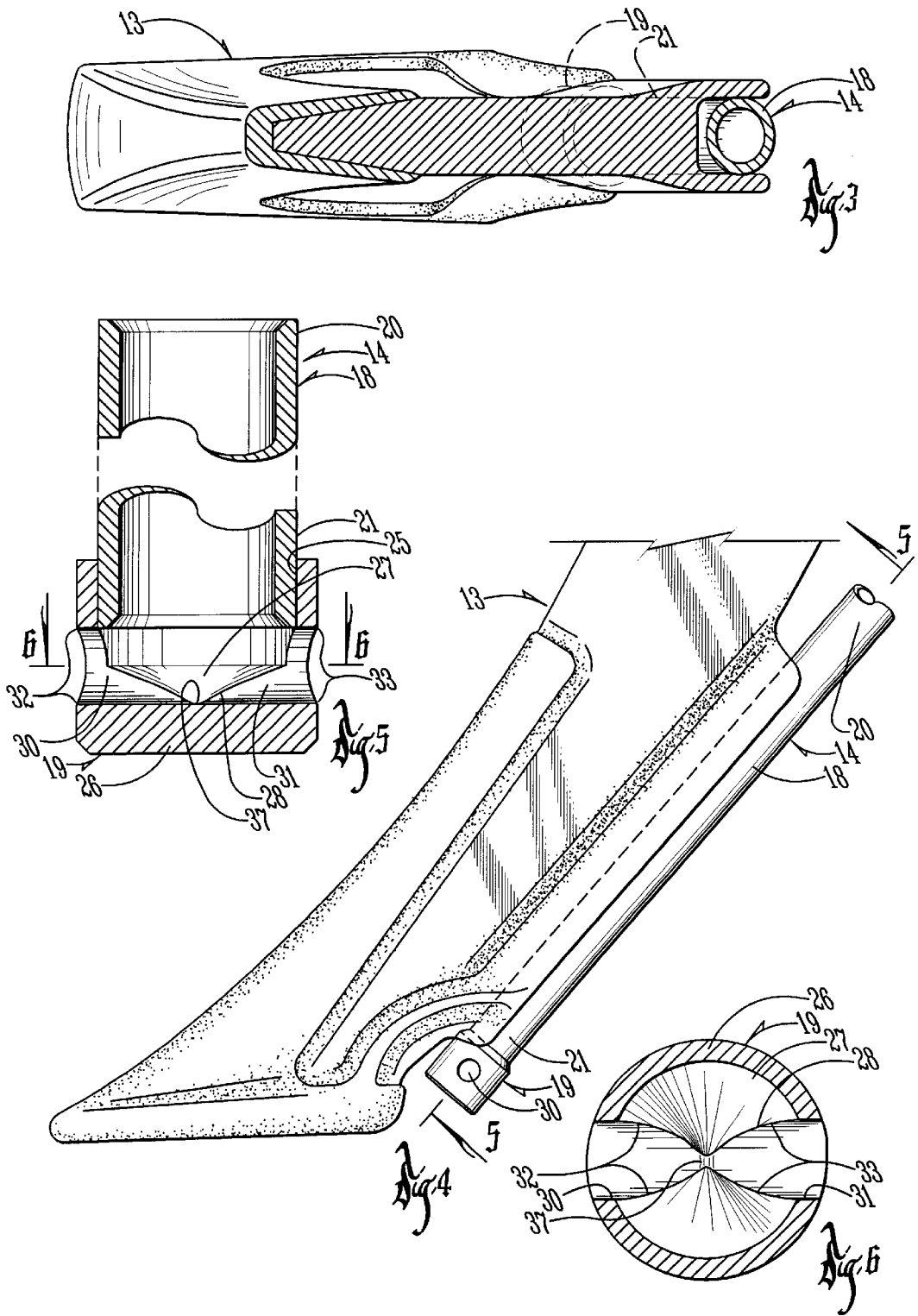

ANHYDROUS AMMONIA APPLICATION DEVICE

BACKGROUND OF THE INVENTION

1. Field of the Invention

The invention relates in general to chemical applicators for agronomic purposes, and more particularly, to applicators pulled by motorized conveyance across crop production land for injecting anhydrous ammonia gas or liquid into the soil. The anhydrous ammonia is delivered in the form of a gas or liquid and replaces nitrogen that is essential for plant growth.

2. Description of the Prior Art

Since the 1960's, the application of anhydrous ammonia to crop production land between growing seasons has been used to replace essential nitrogen in the soil. The process typically requires a pressurized tank of the anhydrous ammonia in liquid form attached to an applicator which injects the anhydrous ammonia into the soil in gaseous or liquid form. The tank and applicator are trailed over the soil to which the anhydrous ammonia is applied. There, until the soil warms, the nitrogen remains in a relatively stable compound. In the spring, as the soil warms and the fields are tilled and planted, the nitrogen is released in a form usable by plants as a vital nutrient.

The keys to effective anhydrous application are the accuracy and reliability of the components of the anhydrous applicator. Without these traits, the applicator will apply more nitrogen through one injector than another. In that case, a farmer must apply the anhydrous ammonia according to the injector that distributes the least nitrogen or risk crop yield. The variance in the amount of anhydrous ammonia delivered through different injectors can be great. The result of compensating for the lowest flow is over-application of nitrogen to the rest of the field. Not only does this increase the costs of production for the farmer, but increases environmental risks from water run-off as well.

The application devices developed in the 1960's were of a relatively simple design and have remained basically unchanged. A conduit and valve releases the liquid (which becomes gaseous at atmospheric pressure) from a tank into a manifold which, in turn, distributes the ammonia to a plurality of tubes. Each of the tubes is connected to an injector assembly. The assembly consists of a knife which creates a furrow in the soil and an ammonia injector attached just behind the knife which delivers the ammonia into the furrow. Discs attached to the applicator on either side of the injector assembly move soil back into the furrow to help keep the nitrogen sealed in the ground.

To transport the anhydrous ammonia from the manifold to the injector assembly, early models simply used tubes of the length needed to reach each of the ammonia injectors. This resulted in tubes of varying length relative to the injector assembly's position and created a large variation between ammonia injectors of pressure and subsequent volume of ammonia delivered. This situation has been improved by making the tubes of uniform length.

The earlier versions of the manifold have also been improved. The modifications have increased the uniformity of the composition of the gas being delivered through the tubes. The ammonia injectors, on the other hand, have remained essentially unchanged since the early days of anhydrous ammonia application.

Without precise delivery of the ammonia by the injectors, the shortcomings of the applicator are still great enough to be problematic to the user. It is thought that the relative lack of attention to modifying the ammonia injectors is due to the assumption that modification would yield only minimal improvement. This assumption, in turn, is probably due to the temperature and pressure sensitivity of the anhydrous ammonia which function as obstacles to effectively applying the ammonia.

Prior art disclosing ammonia injectors leaves much to be desired. Many of the injectors, mounted on the knives, are made of hollow tubes of metal which are crimped either all along their length or at one end. The open end of the injector is typically a sheared end into which the tube from the manifold delivers the anhydrous ammonia. The delivery end of the injector is typically crimped almost closed or sometimes left completely open. Some ammonia injectors have holes drilled near the delivery end, usually in opposition to each other, which deliver the ammonia to the soil. The injectors are often bent at an angle both to facilitate mounting the injector on the knife and to increase the strength of the injector against the ever-upward pressure of the soil as it is dragged across a field.

A myriad of problems are presented by this design. First, as the ammonia enters the injector, the lip of the sheared end creates turbulence. Second, the unevenly crimped and angled shape creates substantial turbulence and, consequently, the need for higher pressure to get enough ammonia through the tube for proper adherence to the soil. This pressure at the point of injection, in turn, creates some compaction of soil as the ammonia hits it and reduces the degree of penetration of the ammonia into the soil.

In addition, because one ammonia injector may be crimped or angled more than the next, the delivery will differ with each injector. If the delivery end is open or is crimped but not sealed, it often becomes plugged with dirt or mud during use; also, if the end is crimped but not completely sealed, it leaks. The leak of one ammonia injector can be much greater than another since the degree of crimping is not uniform. If there are holes near the delivery end of the injector, they are often not precisely drilled creating yet another opportunity for imprecise application. Lastly, the prior art discloses ammonia injectors that must be replaced rather quickly because of wear created by dragging through the soil. The combination of these factors wreak havoc on a farmer's calculations for nitrogen application, and, in turn, negatively effect his bottom line and our environmental health. Accordingly, what is needed is an ammonia injector which applies the anhydrous ammonia precisely and predictably and requires less pressure.

The present invention discloses anhydrous ammonia applicators with precisely formed ammonia injectors having the overall objective to deliver ammonia with far more accuracy than prior art and provide measurable improvement in the predictability and reliability of the application of anhydrous ammonia. More specifically, a first objective of the current invention is to minimize turbulence of the ammonia as it passes through the ammonia injector to the soil and, therefore, to decrease the pressure at which the ammonia must be applied;

A second objective is to significantly increase the uniformity and precision of delivery of the ammonia through the ammonia injectors and the holes in the injectors;

A third objective is to eliminate leaks caused by the crimped, yet unsealed ends of the ammonia injectors;

A fourth and final objective is to increase the tensile strength of the ammonia injector and its useful life.

SUMMARY

The present invention provides an anhydrous ammonia application device with one or more ammonia injectors mounted on the application device to deliver the ammonia precisely and with less pressure; more specifically, the invention resides in the use of an injector that is formed from a smooth, cylindrical metallic tube with a cap on one end and having a precisely formed passage means through which the ammonia is uniformly delivered.

The embodiment of this invention results in advantages not provided by ammonia injectors disclosed in the prior art. The principal advantages of the present invention are that the injector tube provides a smoother and less obstructed conduit through which the ammonia is transported which increases regularity of flow and reduces pressure required; the precisely formed passage means affords far more uniform and accurate means of delivery of the ammonia to the soil; the end cap eliminates leaks and results in increased uniformity of delivery of ammonia across the whole anhydrous applicator, reduces plugging, and extends the lifetime of the injectors.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 1 is a perspective view of a pair of injector assemblies that are mounted on a tool bar and represent a preferred embodiment of the present invention;

FIG. 2 is a perspective view along line 2—2 of FIG. 1 which shows an injector assembly embodying the present invention;

FIG. 3 is a cross sectional view of the injector assembly of FIG. 2 taken along the line 3—3;

FIG. 4 is a side view of the injector assembly of FIG. 2;

FIG. 5 is a cross sectional view taken along the line 5–5 of FIG. 4;

FIG. 6 is a sectional view taken along the line 6—6 of FIG. 5.

DESCRIPTION OF THE PREFERRED EMBODIMENT(S)

Shown by FIG. 1 is a portion of an apparatus 10 that represents a preferred embodiment of the present invention and is used to apply anhydrous ammonia to agricultural crop production land. The apparatus 10 includes a tool bar 11 and a plurality of injector assemblies 12. Each of the injector assemblies 12 includes generally a knife 13 and an injector 14 that is mounted on the rear of the knife 13, as best shown in FIGS. 2 and 4. As those skilled in the art will be aware, hoses 15 are attached to the injectors 14 to convey anhydrous ammonia from a manifold or other means of ammonia distribution to the injectors. The knives 13 are employed to break open the soil as the tool bar 11 travels over a field to permit the injection of the anhydrous ammonia therein. Each of the knives 13 is disposed between a pair of discs 16 that act to cover over with soil the applied ammonia.

Referring now to FIGS. 4 and 5, each of the injectors 14 is preferably of a straight construction and is formed of an injector tube 18 and a cap 19 that closes off the bottom end of the tube 18. Preferably, this end cap 19 is welded onto the tube 18 in a relatively permanent fashion. However, as those skilled in the art will know, the cap 19 may be threadably attached to the tube 18. As best indicated by the section view of the injector tube 18 in FIG. 3, each injector tube 18 is cylindrically shaped. In the preferred embodiment, both the upper and lower ends 20 and 21, respectively, of the tubes 18 are beveled smooth on their insides to minimize turbulence in the flow of ammonia therethrough, which is highly important to providing precise amounts of ammonia through each of the injector assemblies 12. For this same reason the injector tube 18 is neither angled nor crimped but is left straight. For the purpose of increasing the operational longevity of the injector assemblies 12, the injector tubes 12 are formed from high strength metal.

The cap 19 is preferably made of tool steel and is heat treated to increase its durability. A cross section along line 5—5 of FIG. 4 shown in FIG. 5 shows that each cap 19 is tooled to be generally hollow with an upper, open end 25, a closed lower end 26 and a generally cone-shaped interior cavity 27 that has an apex 28 near the lower end of the cap 19. A pair of aligned side bores 30 and 31 are formed in the caps 19 in a radial fashion. Each cap 19 fits over the lower end 21 of said tube 18 in such a way as to leave the side bores 30 and 31 free of obstruction. In the preferred embodiment, the bores 30 and 31 are ¼ or ⅜ inch in diameter and are formed such that their circumferences 32 and 33, respectively overlap with the cone-shaped interior 27. The sectional view of FIG. 6 into the cone-shaped interior of a cap 19 provides further detail of the orientation of the bores 30 and 31, their circumferences 32 and 33 and the interior of the cap 19. As shown thereon, in between the bores 30 and 31 is a narrow ridge 37 that is the only lower part of the interior apex 28 that is left after the bores 30 and 31 are formed. The ridge 37 is formed to direct the flow of ammonia out of the bores 30 and 31, which serve as passage means together with the cone-shaped interior cavity 27 to provide an unobstructed path through which the anhydrous ammonia flows onto to the soil.

Thus, the present invention has been described in an illustrative manner. It is to be understood that the terminology that has been used is intended to be in the nature of words of description rather than of limitation.

Many modifications and variations of the present invention are possible in light of the above teachings. For example, the injector can be shorter than those disclosed by prior art; the cap can be drilled from any shape of solid shaft; welds can be strategically placed to provide further protection from plugged injectors. Therefore, within the scope of the appended claims, the present invention may be practiced otherwise than as specifically described.

What we claim is:

1. A device for the application of anhydrous ammonia into the soil of an agricultural field, said device including a tool bar on which are mounted one or more knives for breaking up the soil and an ammonia injector associated with each of said knives for conveying ammonia to the soil which injectors comprise:

a) a cylindrically shaped metallic injector tube having an upper end connected to a source of said ammonia, a lower end and a generally smooth bore that minimizes the creation of turbulence in the ammonia passing therethrough;

b) a cap secured on the lower end of said tube and having a passage means through which to expel the ammonia into the soil;

c) said cap having an outer closed end;

d) said passage means through which to expel ammonia includes a central interior that is generally cone-shaped with an apex near said closed end; and e) said passage means further comprises at least one precision-drilled bore extending from the exterior of said cap to said apex of the interior.

2. An application device as claimed in claim 1 wherein the ends of said injector tube bore are beveled smooth.

3. An application device as claimed in claim 1 wherein a portion of the circumference of each of said bores of said cap overlaps slightly with said cone-shaped interior wherein the junction of said bores in the interior creates a flat plane.

4. An application device as claimed in claim 3 wherein there are an even number of said bores in said cap that are positioned opposite each other.

5. An application device as claimed in claim 1 wherein said cap is made of steel and is heat treated.

6. An application device as claimed in claim 1 wherein said injector cap is permanently affixed to said tube.

7. A device for the application of anhydrous ammonia into the soil of an agricultural field, said device including a tool bar on which are mounted one or more knives for breaking up the soil and an ammonia injector associated with each of said knives for conveying ammonia to the soil, which injectors comprise:

a) a cylindrically shaped metallic injector tube having an upper end connected to a source of said ammonia, a lower end and a bore that connects between said ends, wherein said ends are beveled smooth, and said bore is generally smooth to minimize the creation of turbulence in the ammonia passing therethrough, and;

b) a cap having an outer closed end secured on the lower end of said tube and having a passage means including an interior that is generally cone-shaped with an apex near said closed end and further comprising at least one precision-drilled bore extending from the exterior of said cap to said apex of the interior through which to expel the ammonia into the soil.

* * * * *

UNITED STATES PATENT AND TRADEMARK OFFICE
CERTIFICATE OF CORRECTION

PATENT NO.    : 6,167,820 B1
DATED         : January 2, 2001
INVENTOR(S)   : Kevin H. Kimberley It is certified that error appears in the above-identified patent and that said Letters Patent is hereby corrected as shown below:

<u>Title page,</u>
Item [75], Inventor's name "Kimberly" should read -- Kimberley --

Signed and Sealed this

Tenth Day of August, 2004

JON W. DUDAS
*Acting Director of the United States Patent and Trademark Office*